United States Patent [19]
Sasaki et al.

[11] Patent Number: 6,076,233
[45] Date of Patent: Jun. 20, 2000

[54] GRAB RAIL AND HOOK ASSEMBLY FOR A VEHICLE

[75] Inventors: Ichiro Sasaki; Kathleen M. Lathrop, both of Dublin; Ronald W. Emerson, Hilliard, all of Ohio

[73] Assignee: Honda Giken Kogyo Kabushiki Kaisha, Tokyo, Japan

[21] Appl. No.: 09/084,775

[22] Filed: May 27, 1998

[51] Int. Cl.[7] .................................................. A45C 13/22
[52] U.S. Cl. .................................. 16/444; 16/445; 16/438
[58] Field of Search ............................ 16/444, 445, 438, 16/335, 342; 296/214, 39.1, 97.1

[56] References Cited

U.S. PATENT DOCUMENTS

| | | | |
|---|---|---|---|
| 1,379,814 | 5/1921 | Gustafson | 16/342 |
| 2,304,223 | 12/1942 | Westrope | 16/342 |
| 3,082,473 | 3/1963 | West | 16/126 |
| 3,562,849 | 2/1971 | Brayshaw | 16/126 |
| 4,221,354 | 9/1980 | Kempkers | 248/293 |
| 4,444,344 | 4/1984 | Marcus et al. | 224/313 |
| 4,720,028 | 1/1988 | Takemura et al. | 224/42.43 |
| 4,993,772 | 2/1991 | Charen | 296/97.1 |
| 5,098,150 | 3/1992 | Smith et al. | 296/97.2 |
| 5,364,149 | 11/1994 | Aymerich et al. | 16/342 |
| 5,366,127 | 11/1994 | Heinz | 224/313 |
| 5,403,064 | 4/1995 | Mahler et al. | 296/214 |
| 5,625,921 | 5/1997 | Smith | 16/112 |
| 5,647,095 | 7/1997 | Takimoto | 16/126 |
| 5,820,205 | 10/1998 | Ammons | 296/214 |
| 5,855,408 | 1/1999 | Rickabus | 296/214 |

FOREIGN PATENT DOCUMENTS

| | | |
|---|---|---|
| 63-156837 | 10/1988 | Japan . |
| 63-160234 | 10/1988 | Japan . |

*Primary Examiner*—Chuck Y. Mah
*Attorney, Agent, or Firm*—Armstrong, Westerman, Hattori, McLeland & Naughton

[57] ABSTRACT

A grab rail assembly for a vehicle includes a base element, a handle, a pivot pin, a cantilevered spring, and a fastener. The base element is engageable with a structural portion of the vehicle. The pivot pin is operatively connected to the handle for pivotally connecting the handle to the base element. Further, the cantilevered spring has a flat leg portion for bearing against flat surfaces of the pivot pin in order to maintain the handle in either a stowed position or an extended position. Furthermore, a fastener is provided for fixing the cantilevered spring and the base element to the structural portion of the vehicle. The pivot pin may also support a hook on which coats and other articles may be hung. The hook is pivotally supported by the pivot pin such that the hook may be positioned in one of a plurality of discrete positions by a detent mechanism.

34 Claims, 11 Drawing Sheets

GRAB RAIL AND HOOK ASSEMBLY FOR A VEHICLE

BACKGROUND OF THE INVENTION

1. Field of the Invention

The instant invention is directed to a grab rail for a vehicle. More specifically, it is directed to a grab rail for use in the interior of a vehicle, and more particularly to a grab rail installed in a headliner above a seating position in a motor vehicle. The grab rail according to the instant invention may be fixed in at least two positions and may also include a hook on which objects may be hung.

2. Description of the Related Art

In the past, grab rails used in motor vehicles have often employed a torsional spring so that the handle of the grab rail can be moved from a stowed position to an extended position, in which it may be used by a passenger in the vehicle. In the stowed position, the handle lies flat against the headliner allowing increased head room. The passenger must grab the handle of the grab rail and pull it down from its stowed position to reach the extended position. The passenger must hold the grab rail in the extended position against the biasing force of the torsional spring. Thus, when the passenger releases the handle of the grab rail, it returns to the stowed position. In order for the grab rail to remain in the extended position, the passenger must continuously apply a force in order to hold the grab rail in the extended position.

SUMMARY OF THE INVENTION

The grab rail, in accordance with the instant invention, is intended to provide an easy to use and easy to manufacture grab rail which may be maintained in either one of a stowed position and an extended position.

A grab rail assembly for a vehicle, in accordance with the instant invention, includes a base element, a handle, a coupling, a biasing device, and a fastener. The base element is engageable with a structural portion of the vehicle. The coupling is operatively connected to the handle and pivotally connects the handle to the base element. Further, the biasing device is engageable with the coupling and biases the coupling into one of a plurality of discrete positions with respect to the base element. Furthermore, the fastener fixes (or fastens) the biasing means and the base element to the structural portion of the vehicle.

Ideally, the pivot mechanism includes a pivot pin having first and second longitudinally extending flat surfaces. Furthermore, the biasing means is a cantilevered spring having the flat leg portion extending outwardly therefrom. The flat leg portion is engageable with the first and second flat surfaces of the pivot pin in order to bias the handle into either a stowed position or an extended position. A hook for hanging coats and other articles can be pivotally connected to the pivot pin. The hook includes a detent mechanism so that the hook can pivot to various detent positions.

Additionally, the biasing device, or cantilevered spring, and the base element are fixed to a structural portion of the vehicle by the fastener. This feature enables the cantilevered spring to be securely fastened to a structural portion of the vehicle, such that a very high strength steel, or other spring material, may be used for the cantilevered spring, in order to provide a long lasting biasing device in which the force to move the handle from a stowed position to an extended position and vice versa does not change significantly.

It is an object of the instant invention to provide a grab rail assembly which allows the handle of the grab rail assembly to be maintained in one of a stowed position and an extended position.

It is another object of the invention to provide for an easily manufactured and installed grab rail assembly which has the above-mentioned features. The pivot pin functions as a pivot, as well as an element having flat surfaces to bear against the cantilevered spring to provide a stable stowed or extended position. Thus, fewer parts are needed than in conventional grab rail assemblies.

It is another object of the invention to provide a hook, for hanging coats or other articles on, which is integrated into the grab rail assembly. Specifically, the hook is supported by the same pivot pin that also functions to pivotally connect the handle to the base element. Thus, a reduction of parts is accomplished, while ease of assembly is improved.

Thus, a grab rail assembly, in accordance with the instant invention, will allow the handle of the grab rail assembly to remain in the stowed position or to remain in the extended position, depending on the users desire. Preferably load force of at least 1.5 kg is required to move the handle from one position to another. It should be noted that the spring can be designed for application of other load forces. Thus, the user may leave it in the extended position if he expects to hold on to the handle, without having to pull it down from the stowed position to the extended position every time he wishes to use it.

DETAILED DESCRIPTION OF THE INVENTION

The grab rail assembly according to the instant invention will now be described with reference to FIGS. 1–10.

Figure 1:
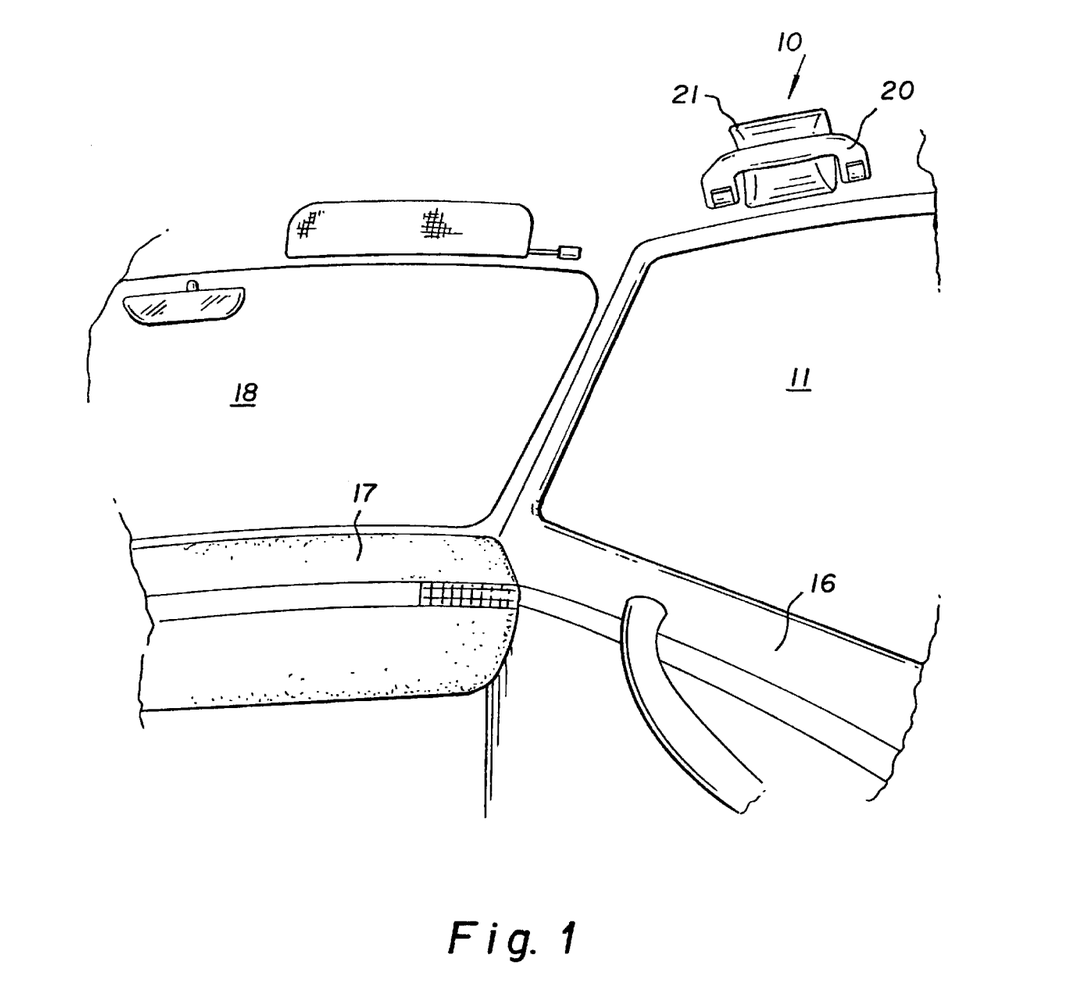
FIG. 1 illustrates the grab rail in accordance with the instant invention mounted above a seating position in the interior of a motor vehicle.

FIG. 1 illustrates the grab rail assembly installed in the headliner of the interior of a motor vehicle. The grab rail assembly 10 is located above the window 11 and the door 16 of a motor vehicle. Dashboard 17 and windshield 18 define the forward portion of the passenger compartment of the motor vehicle and grab rail assembly 10 is positioned so that it may be reached by a passenger in the right front seat (not shown). A recessed area 21 on the headliner is located underneath the handle 20 of the grab rail so that a user can insert his hand under the handle 20 and easily grasp it.

Figure 2:
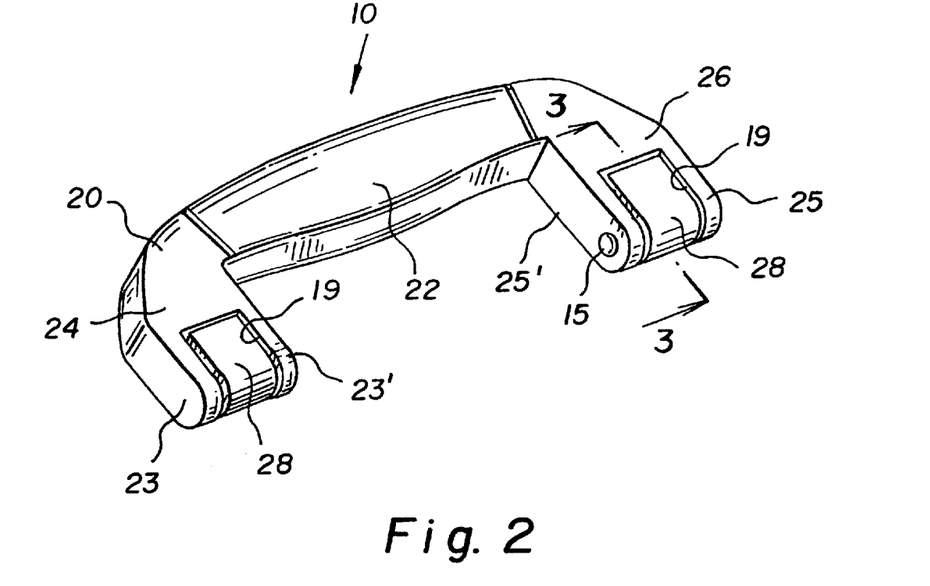
FIG. 2 is an illustration of the grab rail assembly according to the instant invention in which the grab rail is oriented in a stowed position.

FIG. 2 is a perspective view of the grab rail assembly 10 oriented in the stowed position. Handle 20 of grab rail assembly 10 includes a web 22 with arms 24 and 26 extending perpendicularly from web 22 at opposite ends thereof. Brackets 28 are disposed within cutouts 19 located at ends 23, 23' of arm 24, and ends 25, 25' of arm 26. Pivot pin 15, serving as a coupling between the handle 20 and bracket 28, is inserted through a remote end 25' of arm 26, as illustrated in FIG. 2 through brackets 28 and into the opposing remote end 25 of arm 26.

Figure 3:
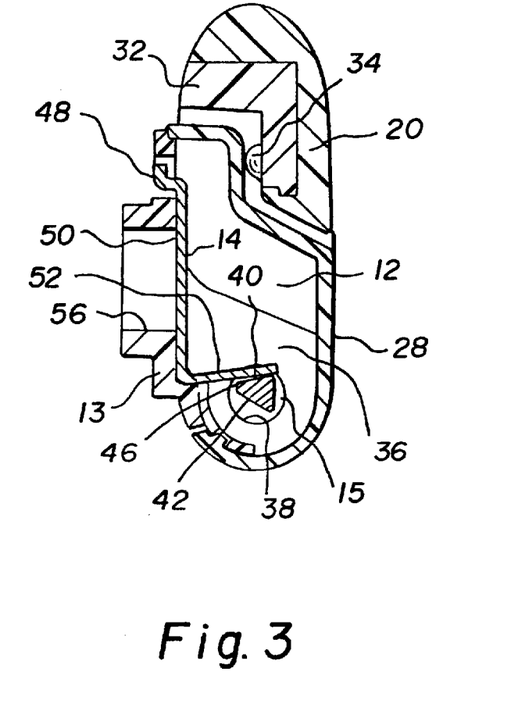
FIG. 3 is a cross sectional view of a portion of the grab rail assembly of FIG. 2, taken along the line 3—3.
Figure 6:
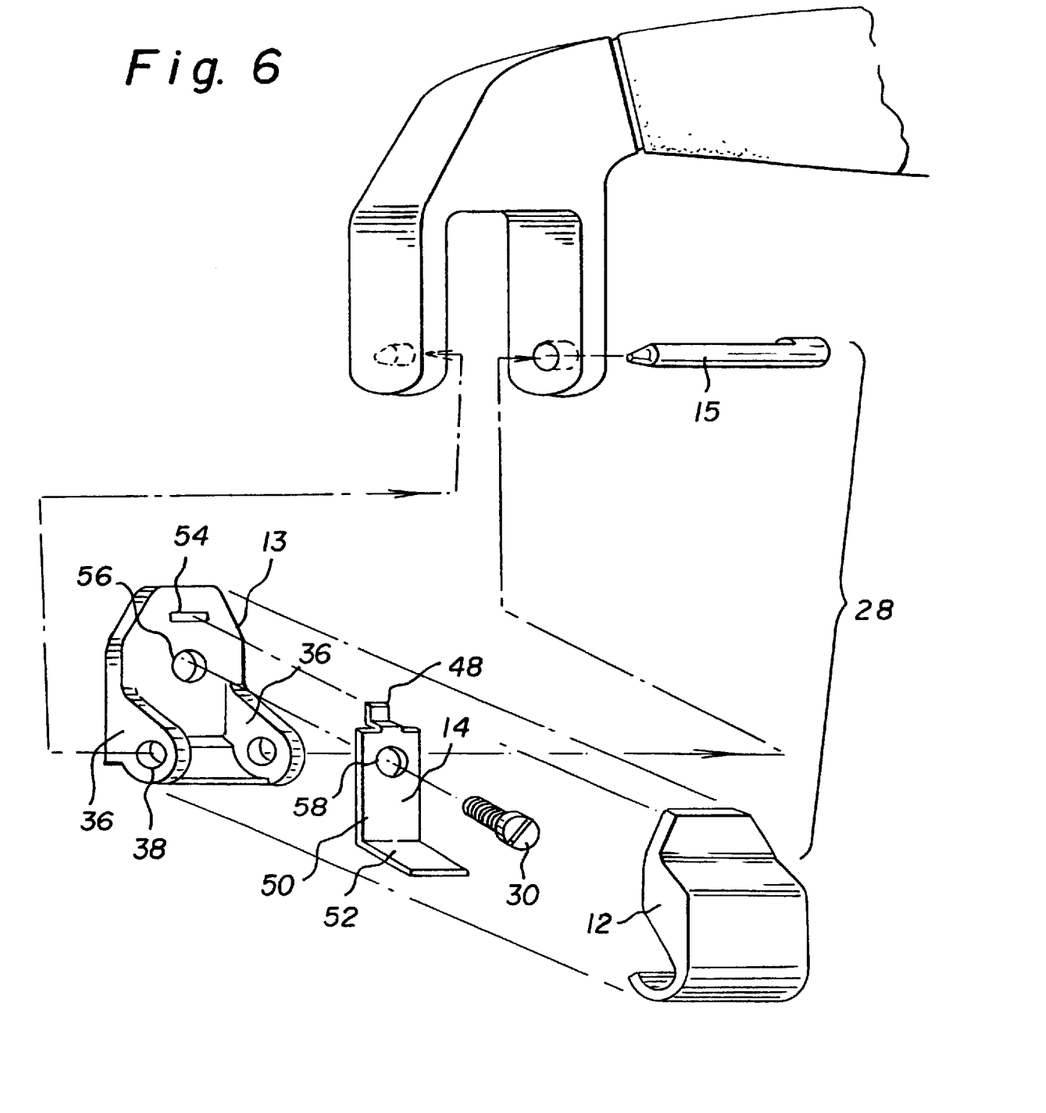
FIG. 6 is an exploded view of one end of the grab rail assembly.
Figure 7:
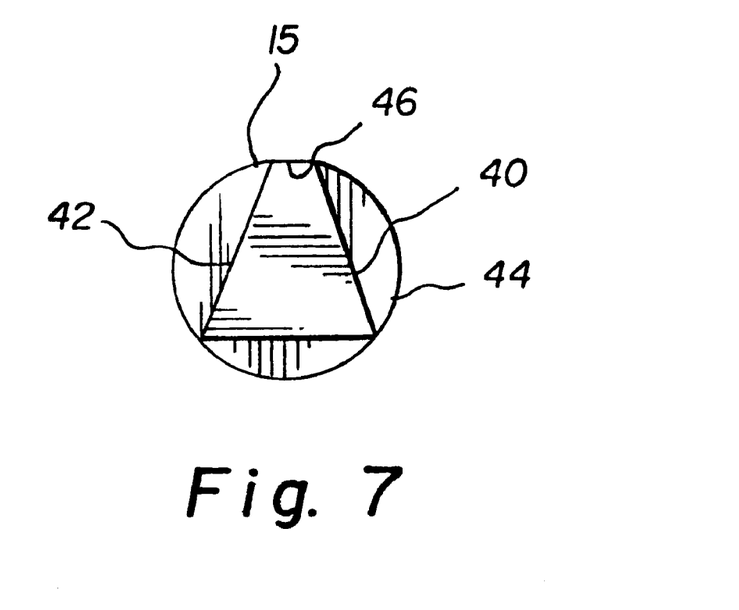
FIG. 7 is an end view of the pivot pin.
Figure 8:
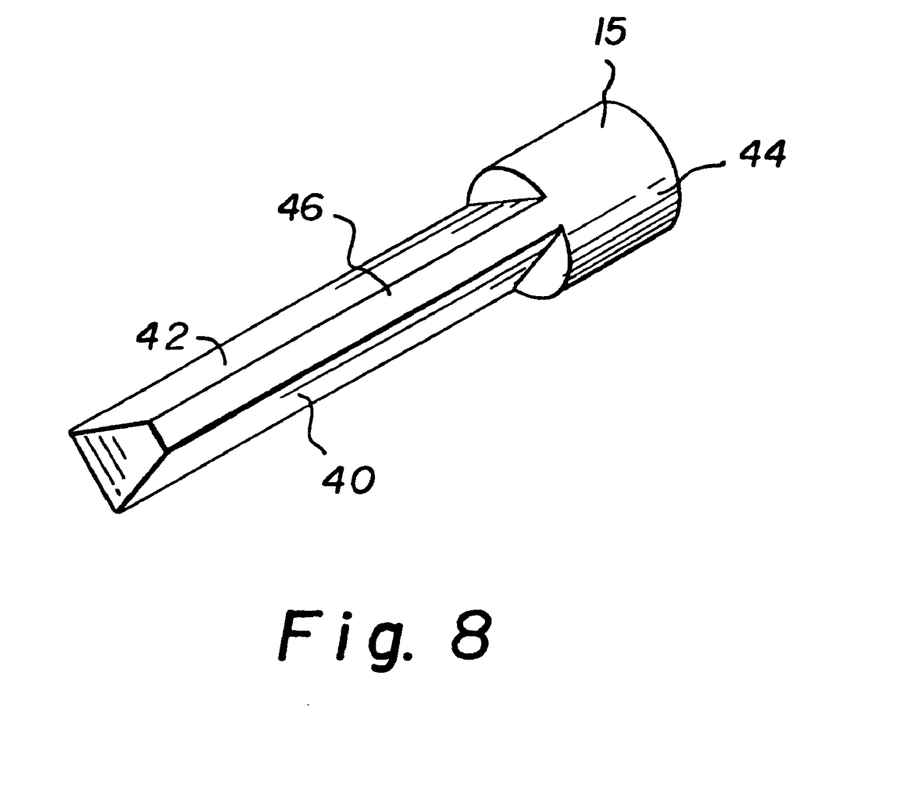
FIG. 8 is a perspective view of the pivot pin.

FIG. 3 is a cross-sectional view of a portion of the grab rail assembly of FIG. 2, taken along line 3—3. As illustrated in FIGS. 3 and 6, each bracket 28 includes a base 13, a cap 12, and a cantilevered spring 14. Cantilevered spring 14, which serves as a biasing device, and base 13 are secured to a frame portion of the vehicle (or the headliner or some other fixed structure) by a fastener. Cap 12 is adapted to cover base 13 and cantilevered spring 14. In FIG. 3, handle 20 is in the stowed position. In such position, a resilient insert 32 is provided in handle 20. A bumper 34 is formed on an interior surface of resilient insert 32 and bears against a portion of cap 12. As can be seen in FIGS. 3 and 6, base 13 has a pair of side plates 36, each having a hole 38 therein. Pivot pin 15 is inserted through holes 38. In FIG. 3, pivot pin 15 is seen inside of hole 38. As also seen in FIGS. 7 and 8, pin 15 has flat surfaces 40 and 42. A round end portion 44 extends a portion of the length of pivot pin 15 at an inside portion thereof. In FIG. 3 it can be seen that narrow edge 46 extends toward the left of the drawing, with a flat surface 40 facing upward and flat surface 42 facing generally downward.

Cantilevered spring 14, as seen in FIGS. 3 and 6, has a generally L-shape with a main vertical element 50 extending generally vertically in front of base 13 and a leg 52 extending outwardly from a lower end of vertical element 50. A clip 48 is provided at the upper most portion of vertical element 50 in order to mate with aperture 54 in base 13, in order to attach the cantilevered spring 14 to base 13. A hole 56 is provided in the central portion of base 13. Furthermore, a hole 58 is provided in a central portion of vertical element 50 of cantilevered spring 14. Hole 58 of spring 14 corresponds with hole 56 of base 13. A fastener, such as a machine screw 30 is inserted through holes 58 and 56 and then secured to a frame of the vehicle, or other fixed structure portion. Of course, any appropriate type of fastener, such as a sheet metal screw, a bolt, etc., may be used.

Figure 4:
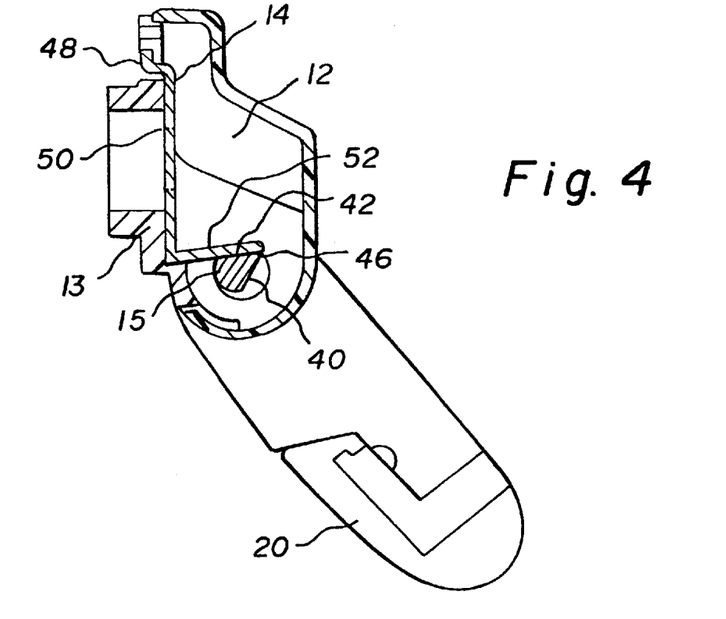
FIG. 4 is a cross sectional view similar to FIG. 3, wherein the handle of the grab rail assembly is in the extended position.

FIG. 4 is similar to FIG. 3, with the handle 20 in the extended position. Elements of FIG. 4 correspond to the same elements of FIG. 3. In FIG. 4, with the handle in the extended position, pivot pin 15 is oriented differently than in FIG. 3. Since pivot pin 15 is fixed with respect to the handle, when the handle is pivoted, with respect to base 13, pivot pin 15 also pivots the same amount with respect to base 13. Narrow edge 46 of pivot pin 15 points to the right of the drawing when the handle is in the extended position. Flat surface 42 is facing upward and bears against leg 52 of spring 14. Flat surface 40 faces downwardly and to the right. Pivot pin 15 is fixed to handle 20. Thus, handle 20 is kept at the stowed position when flat surface 40 bears against leg 52 of spring 14. Handle 20 remains in the extended position when flat surface 42 bears against leg 52 of spring 14. It is the biasing force of spring 14 that tends to maintain the relative orientation between leg 52 of spring 14 and either flat surface 40 or 42 of pin 15. Thus, the flat portion of leg 52 tends to remain flat against flat surface 40 or flat surface 42 of pin 15.

Figure 5A:
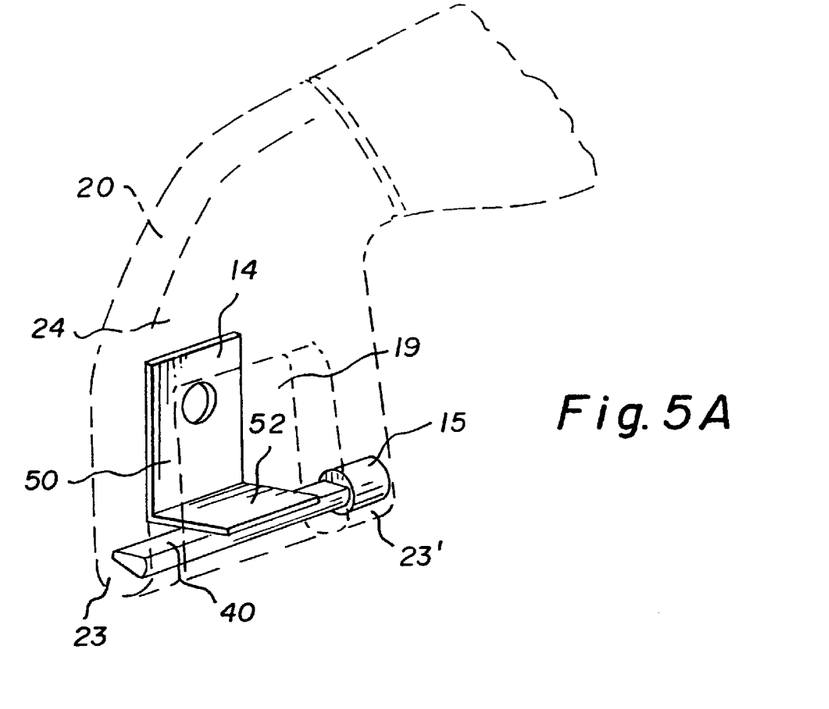
FIGS. 5A and 5B illustrate the interaction between the cantilevered spring and the pivot pin, with the handle in phantom.
Figure 5B:
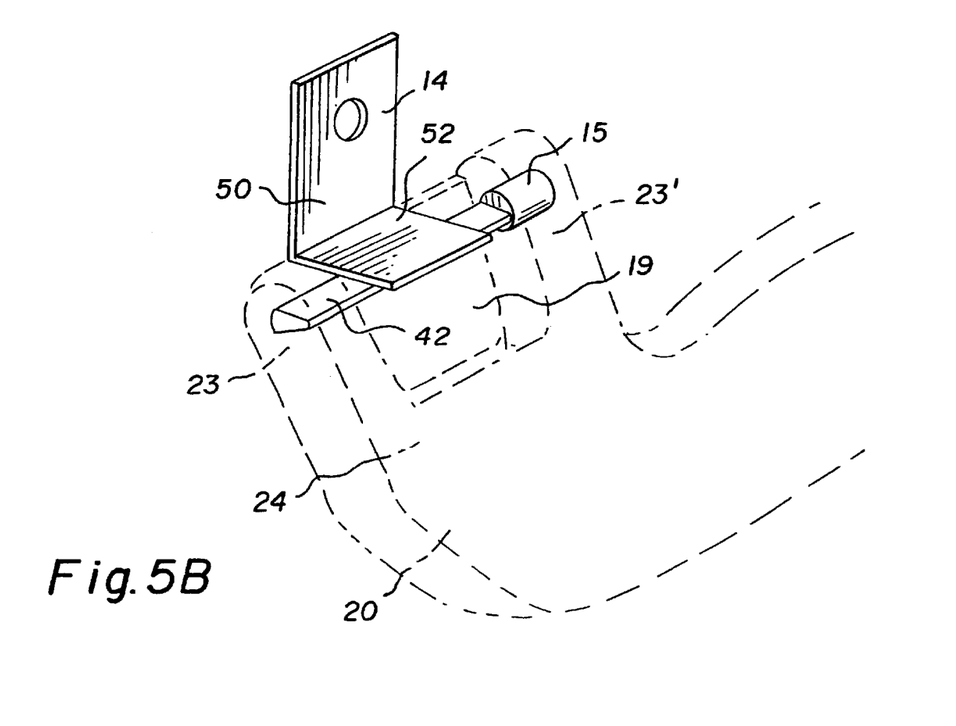

FIGS. 5A and 5B illustrate the interaction between the cantilevered spring and pivot pin 15. Handle 20 is seen in phantom. Numerous elements have been left out in order to maintain the simplicity of these figures to enhance understanding. Cantilevered spring 14 is illustrated in FIGS. 5A and 5B having a vertical element 50 and generally perpendicular leg 52. The handle 20 (shown in phantom) has pivot pin 15 extending across cut-out 19 from one end 23' to the other end 23 of arm 24. FIG. 5A illustrates the stowed position in which flat surface 40 of pivot pin 15 bears against the flat surface of leg 52 of spring 14. In FIG. 5B, handle 20 has been rotated from its stowed position to its extended position because pin 15 is fixed with regard to handle 20. As handle 20 rotates, so does pin 15, since pin 15 is fixed with respect to handle 20. Thus, in the extended position, illustrated in FIG. 5B, flat surface 42 now bears against the bottom flat surface of leg 52. Thus, pivot pin 15 functions as a pivoting member on which handle 20 pivots, as well as a detent-type mechanism to maintain the handle in one of two different positions.

Figure 9:
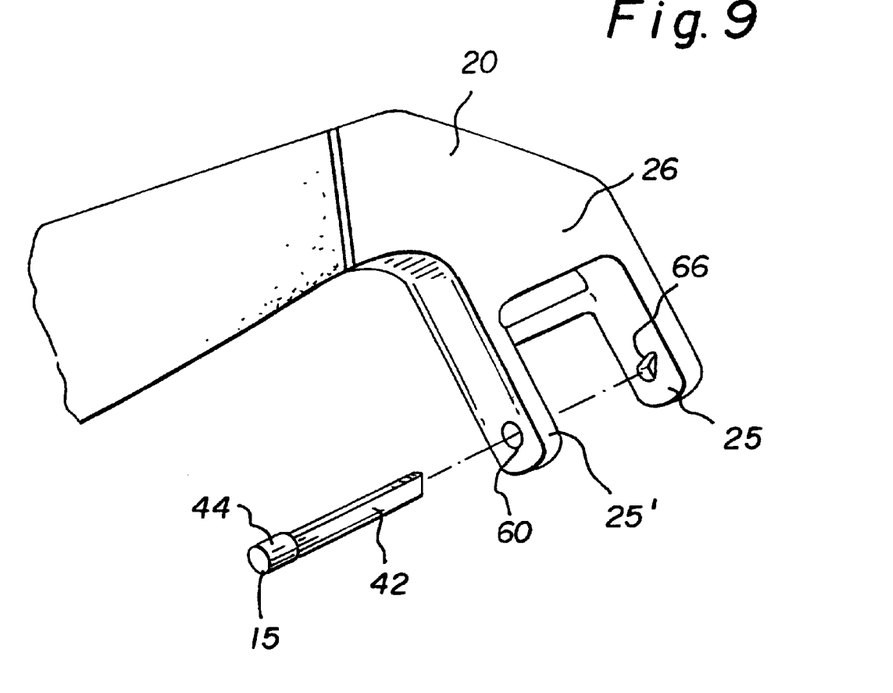
FIG. 9 is a perspective view of the pivot pin as it being inserted into the handle.

FIG. 9 illustrates the positioning of a pivot pin 15 in the ends 25, 25' of arm 26 of handle 20. This diagram merely illustrates the pin accepting structure and does not consider the elements of brackets 28 through which pivot pin 15 is also threaded. The pivot pin 15, with round end portion 44 on the inside, is inserted through a hole 60 formed in an inside end 25' of arm 26. The forward portion of pin 15 (with flat surfaces 40 and 42) extends through hole 60 of inside end 25', through a bracket 28 (not shown) and into a nesting cavity 66, which has the same shape as the end of pivot pin 15, remote from round end portion 44. Preferably, pivot pin 15 is ultrasonically welded to arm 25 in nesting cavity 66. Alternatively, pivot pin 15 may be press fit into engagement with nesting cavity 66 so that pivot pin 15 is fixed (non-rotatable) with respect to handle 20.

Figure 10:
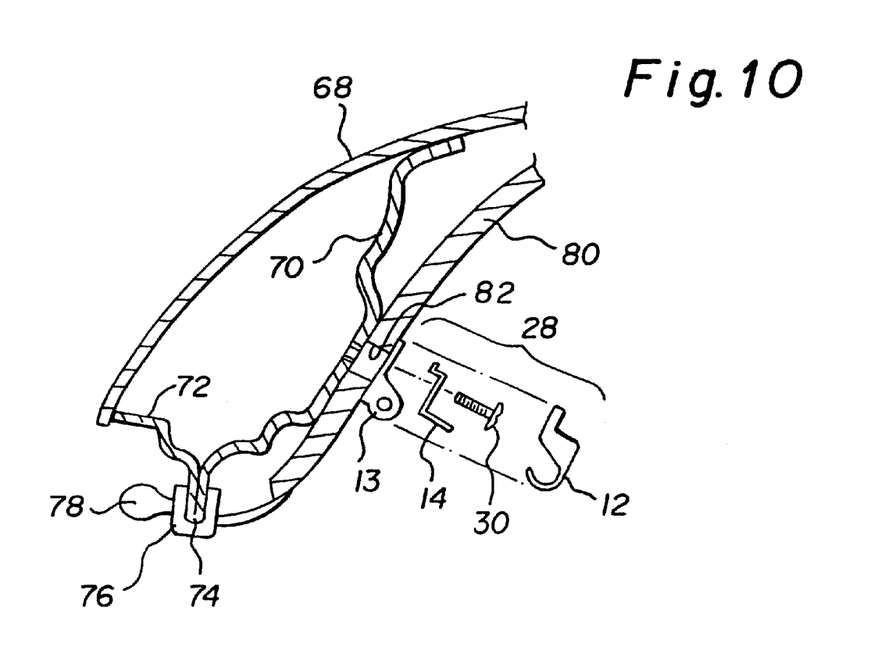
FIG. 10 is a cross sectional view of the structure of the motor vehicle illustrating how the mounting bracket is attached to the vehicle.

FIG. 10 is a cross-sectional view of the structure of the motor vehicle, illustrating how the mounting bracket is attached to the vehicle. Specifically, the cross-sectional view of FIG. 10 only illustrates an upper proportion of the vehicle structure. A box-like structure is formed by a portion of outer roof 68 connected (preferably by welding) at an upper portion thereof by inner structural member 70 and at a lower portion thereof by lower plate 72. Inner structural member 70 and lower plate 72 are joined at weld line 74. Weld line 74 is covered by molding 76 to which is attached weather stripping 78. Inner structural member 70 provides a fixed structure onto which headliner 80 may be attached. Brackets 28 consisting of base 13 and cantilevered spring 14 and cap 12 are secured to the inner structural member 70 by way of machine screw 30. Machine screw 30 holds base 13 and spring 14 against inner structural member 70 through hole 82 in headliner 80. Thus, base 13 and spring 14 are attached to the headliner 80 by the machine screw 30 extending through the headliner into inner structural member 70. With this structure, cantilevered spring 14 may be made out of very strong spring steel and is attached very securely to a structural member of the vehicle. Because of this, cantilevered spring 14 provides for a stronger exing of the handle 20 in either the stowed or extended position. Ideally, it will require 1.5 kilograms of force to shift the handle from a stowed position to an extended position and vice versa.

Figures 11, 12:
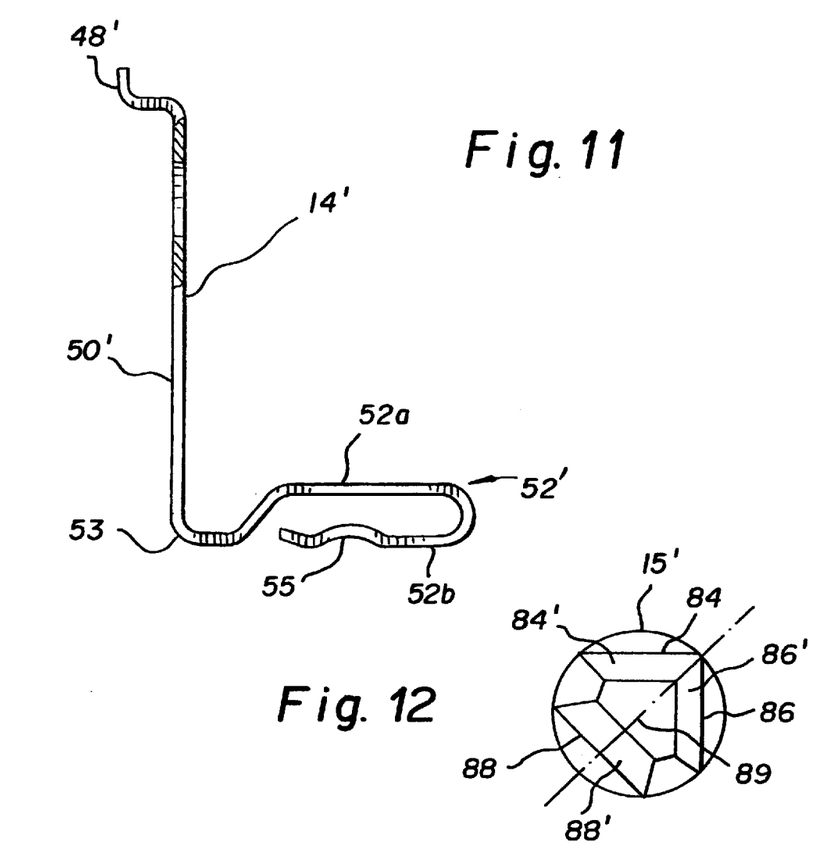
FIG. 11 is a cross sectional view of an alternate cantilevered spring for use with the instant invention.
FIG. 12 is an end view of an alternate pivot pin which may be used with the instant invention.
Figure 11A:
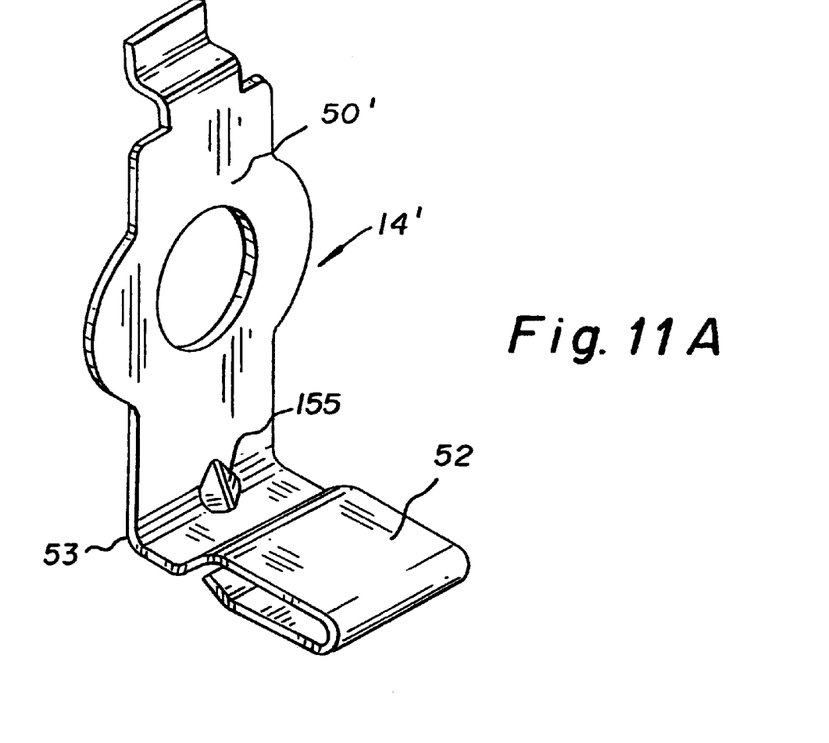
FIG. 11A is a perspective view of another alternate cantilevered spring for use with the instant invention.

FIG. 11 illustrates an alternate version of the cantilevered spring 14 illustrated in FIG. 6. Specifically, in FIG. 11, cantilevered spring 14' has the same general L-shape as spring 14 (FIG. 6), with a clip 48' at the upper portion thereof. Spring 14' has a vertical element 50' and a leg 52'. The leg 52' has an upper portion 52a and a lower portion 52b. Lower portion 52b extends from the remote end of upper portion 52a and bends back around in order to be substantially parallel with upper portion 52a. Lower portion 52b reduces the stress on the intersection 53 between the lower end of vertical element 50' and leg 52'. The stress is reduced by dissipating some of the compression forces in the bend between upper portion 52a and lower portion 52b. The lower portion 52b further includes a corrugation 55 for additional strength thereof. It is also possible to have a plurality of corrugations at 55. FIG. 11A shows another cantilever spring 14' in which a stiffener 155 is disposed at the intersection 53 between the lower end of the vertical element 50' and leg 52' to increase the strength of the spring 14'.

FIG. 12 is an end view of an alternate version of the pivot pin. In FIG. 12, pivot pin 15' is seen from the insertion end. Pivot pin 15' has flat sides 84 and 86 which are perpendicular with respect to one another and extend longitudinally along the axis of pin 15'. Furthermore, a diagonal flat side 88 is provided opposite flat sides 84 and 86. Beveled ends 84', 86' and 88' extend from the end of flat side 84, flat side 86 and diagonal flat side 88, respectively. Beveled ends 84', 86' and 88' are provided to ease the insertion of pin 15' into the appropriate nesting cavity 66. It should be noted that from the view of FIG. 12 that pin 15' is symmetrical about a line bisecting the intersection of flat sides 84 and 86. More specifically, in FIG. 12, pivot pin 15' is symmetrical with regard to a plane 89 bisecting the intersection of perpendicular flat sides 84 and 86. Plane 89 is also perpendicular to diagonal flat side 88. Accordingly, the same pin can therefore be used for either arm 24 or 26.

Figure 13:
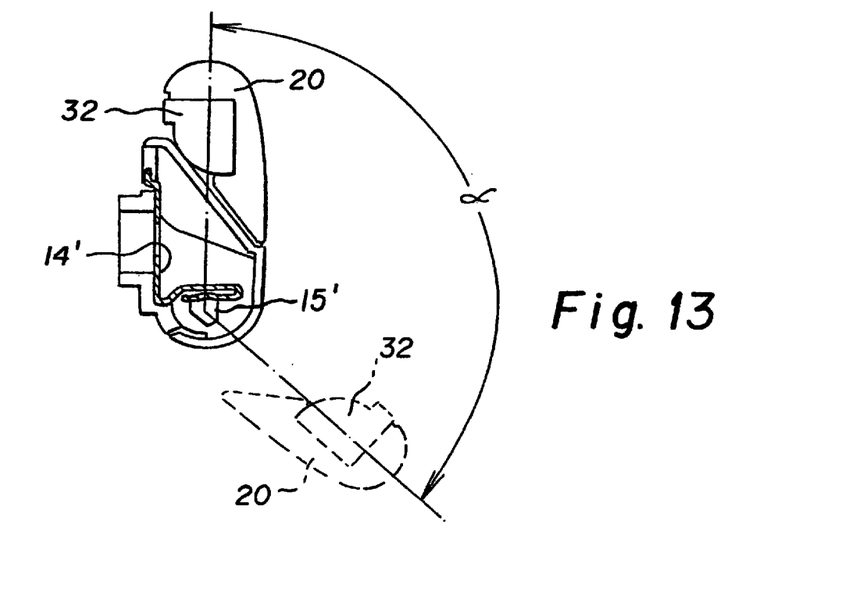
FIG. 13 is a cross sectional view of the grab handle employed in the alternate cantilevered spring of FIG. 11 and the pivot pin of FIG. 12.

FIG. 13 is a cross sectional view of the grab rail assembly, illustrating the stowed and extended position. FIG. 13 illustrates the handle 20 in an upright, stowed position. At the lower right of FIG. 13, the handle 20 is illustrated in an extended position, in which the handle 20 has been rotated through an angle a. A resilient insert 32 can be seen in handle 20. Cantilevered spring 14' is illustrated in FIG. 13 in contact with pivot pin 15' (as illustrated in FIGS. 11 and 12, respectively).

Figure 14:
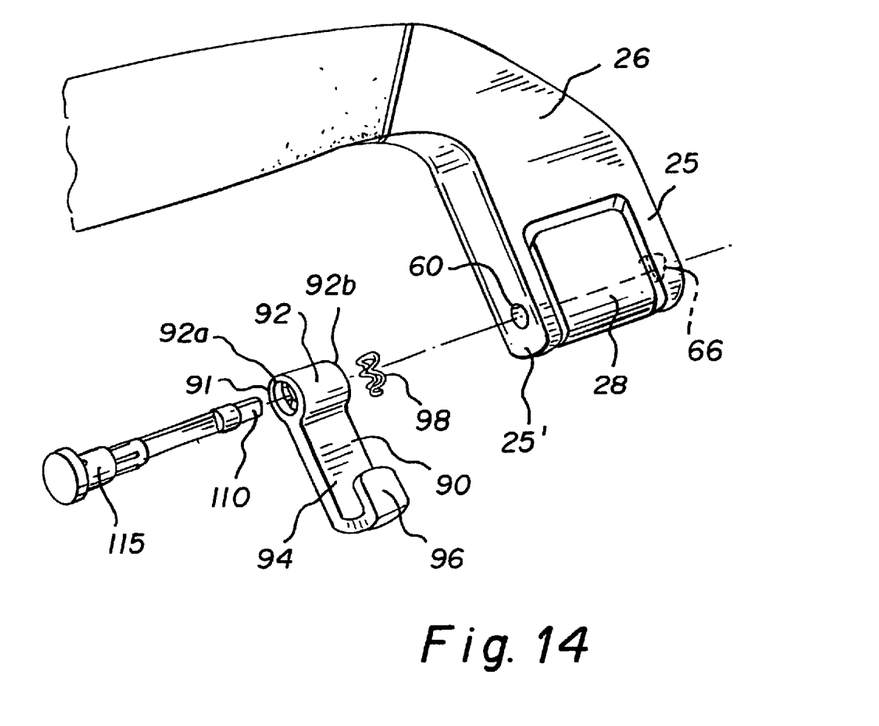
FIG. 14 is an exploded view of the grab handle assembly employing a hook.

FIG. 14 illustrates an exploded view of the grab rail assembly integrated with hook 90. Hook 90 includes eye portion 92, arm portion 94 extending from the eye portion 92, and hook portion 96 extending from arm portion 92 and providing a hook structure for hanging articles on. These features may also be seen in FIGS. 15–17. In FIG. 14, arm 26 is seen having inside end 25' and outside end 25. Bracket 28 is located between inside end 25' and outside end 25. Furthermore, pivot pin 115 is inserted through opening 91, eye portion 92 of hook 90, through the center of wave washer 98, through hole 60 (in inside end 25' of arm 26), through bracket 28, and the nose section 110 of pivot pin 115 rests in nesting cavity 66.

Figure 15:
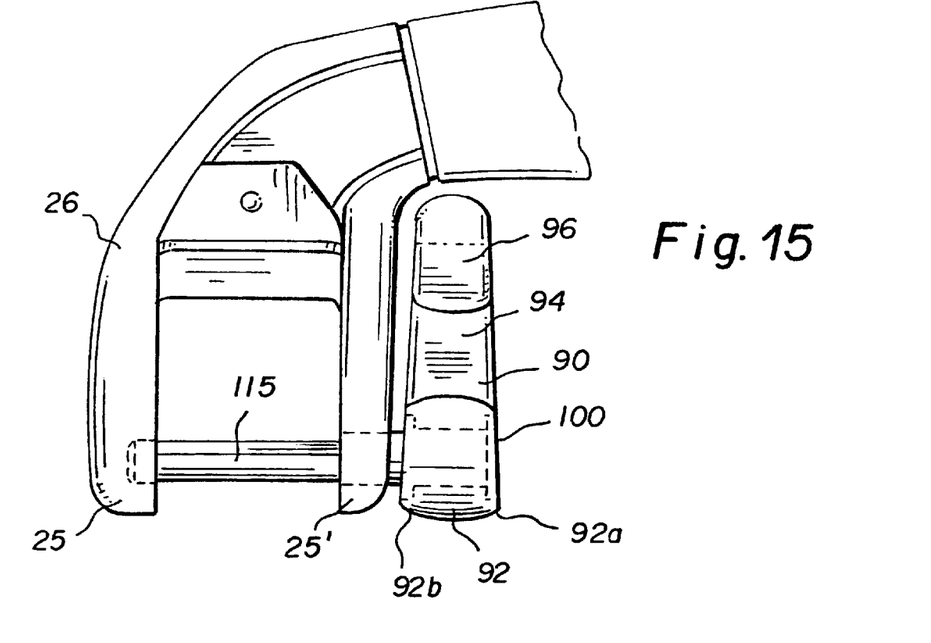
FIG. 15 is a front view of the hook of FIG. 14, in position with a handle.

FIGS. 15–19 illustrate the structural elements that make up the grab rail assembly when integrated with hook 90. FIG. 15 illustrates arm 26 from the back side, the opposite side as illustrated in FIG. 14. In FIG. 15, bracket 28 is not shown, but pivot pin 115 is illustrated in position, maintaining hook 90 in its upright, non-extended position. As can be clearly seen, hook 90 is adjacent the inside of arm 26, coupled near end 25'.

Figures 16, 17:
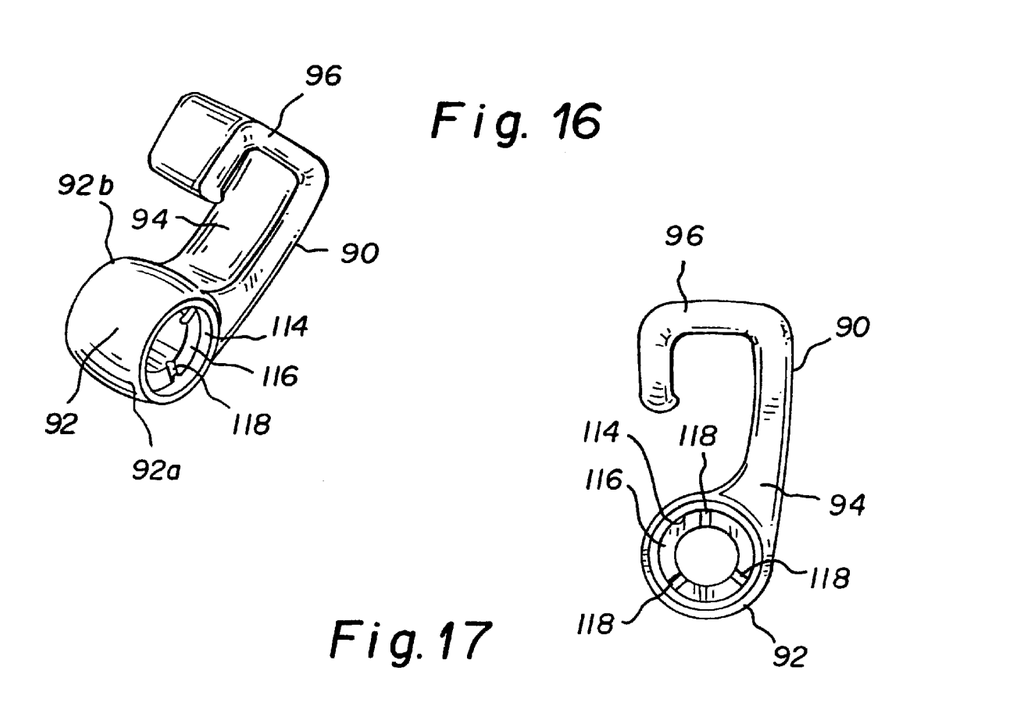
FIG. 16 is a perspective view of the hook of FIGS. 14 and 15.
FIG. 17 is a side view of the hook of FIG. 16.
Figure 18A:
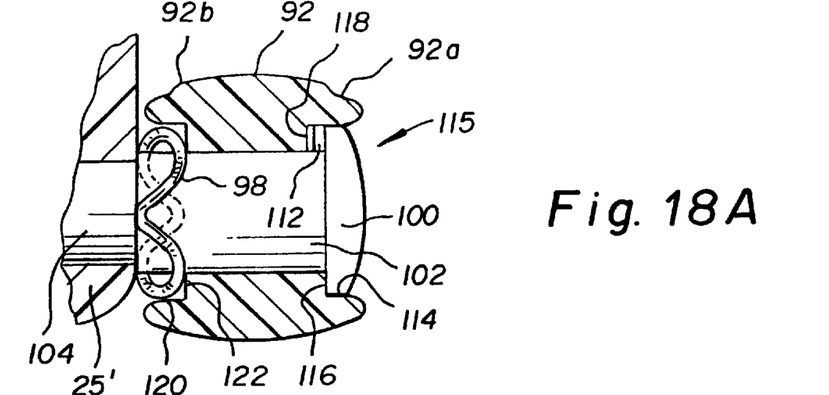
FIG. 18A is a cross section of the eye of the hook with the hook held in position by the pivot pin an biased by a wave washer.
Figure 18B:
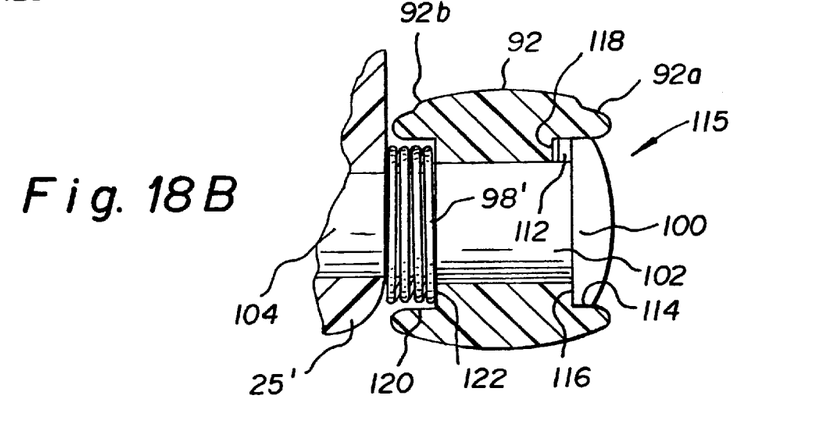
FIG. 18B is similar to FIG. 18A, except that the eye of the hook is biased by a coil spring.

FIG. 16 is a perspective view of the hook 90 of FIGS. 14 and 15. FIG. 17 is a side view of hook 90 of FIGS. 14 and 15. FIG. 18A illustrates a cross sectional view of eye portion 92 of hook 90 held in position by pivot pin 115. Eye portion 92 has a head side 92a nearest head 100 of pivot pin 115, and a wave washer side 92b nearest wave washer 98. FIGS. 16 and 17 illustrate hook 90 from head side 92a. From head side 92a of hook 90, a generally cylindrical recess is formed with a step 116 being formed generally perpendicular to the axis of eye portion 92. Step 116 includes notches 118 extending generally radially with respect to the axis of eye portion 92. FIG. 18B is similar to the structure of FIG. 18A, except that there is no wave washer in FIG. 18B. Instead, a coil spring 98' biases the eye portion 92 of hook 90 toward head 100 of pivot pin 115.

Figure 19:
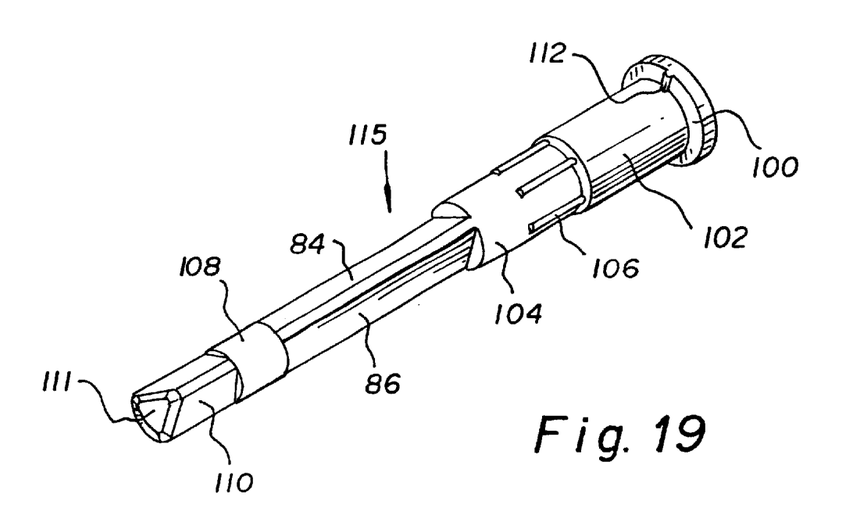
FIG. 19 is a perspective view of the pivot pin for use with the hook of FIGS. 14–18.

FIG. 19 illustrates pivot pin 115. Pivot pin 115 has a head 100 and an axially extending cylindrical in section 102 extending from head 100. Cylindrical end section 102 substantially provides a bearing surface for eye portion 92 of hook 90 to rotate thereabouts. An intermediate cylindrical section 104 extends from the end of cylindrical end section 102. Intermediate cylindrical section 104 has friction ridges 106 positioned circumferentially around the surface thereof in an axial direction. Friction ridges 106 help pivot pin 115 to remain in place. Extending from intermediate cylindrical section 104 are flat sides 84 and 86, as seen in FIG. 12. Furthermore, a cylindrical tip section 108 is provided extending from flat sides 84 and 86 and nose section 110 having a bevel tip 111, extends from cylindrical tip section 108. Furthermore, a radially extending projection 112 is seen on a bottom surface of head 100. Intermediate cylindrical section 104 and cylindrical tip section 108 provide a bearing surface for holes 38 on bracket 28. As seen in FIGS. 15, 18A and 18B, when pivot pin 115 is secured in place, wave washer 10 98 is positioned between wave washer side 92b of eye portion 92 and end 25' of arm 26. In FIGS. 18A and 18B, the eye portion 92 has a recess 120 and a step portion 122 for seating wave washer 98. Wave washer 98 provides a biasing function toward the head 100 of pivot pin 115. Thus, hook 90 is allowed to rotate around pivot pin 115.

A detent mechanism is provided in order to enable the hook 92 remain in one of a plurality of predetermined positions. For example, the head 100 of pivot pin 115 nests within recess 114 of eye portion 92. In fact, the bottom portion of head 100 bears against step 116. Projection 112 on the bottom of head 100 will nest into one of notches 118 formed radially in step 116. This enables the hook 90 to be provided in one of a plurality of predetermined angular orientations. Wave washer 98 provides a biasing force in order to help projection 112 properly seat into one of notches 118. Thus, these elements form a detent mechanism, allowing hook 90 to pivot to one of several predetermined positions, when a torsional force is applied to hook 90, which exceeds and thus overcomes the biasing force of wave washer 98.

Figure 20A:
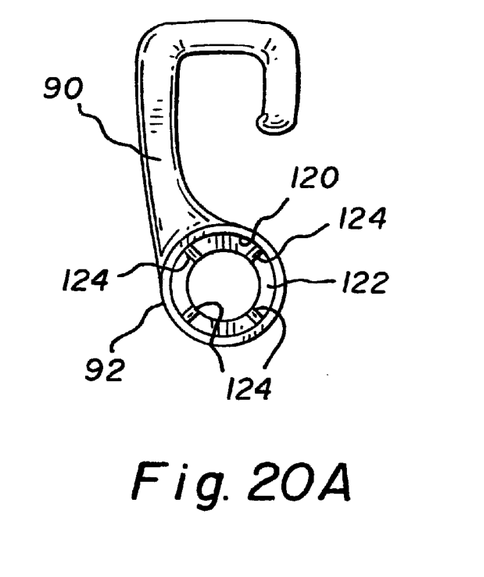
FIG. 20A illustrates the wave washer side of the hook and FIG. 20B illustrates a side view of the wave washer itself.
Figure 20B:
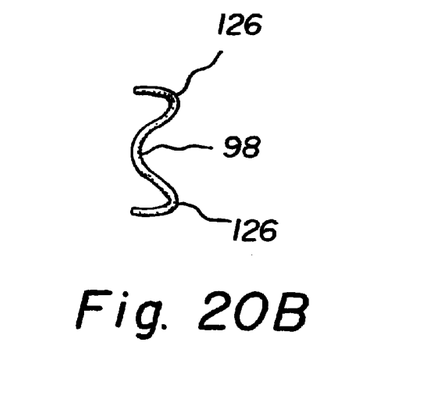

FIGS. 20A and 20B illustrate an alternate detent mechanism from that described above. FIG. 20A illustrates a side view of hook 90 from the wave washer side 92b. This is an opposite view from that illustrated in FIG. 17. FIG. 20A shows recess 120 with a step 122 generally perpendicular to the axis of eye portion 92. A plurality of notches 124 are illustrated as being formed in step 120 and extending generally radially with respect to the axis of eye portion 92. Recess 120 provides lateral support for wave washer 98, as further illustrated in FIG. 18. FIG. 20B illustrates a side view of wave washer 98. Since wave washer 98 is generally circular, FIG. 20b shows to wave ridges 126. Wave washer 98, in FIG. 23B, has two additional wave ridges which are behind those illustrated in this side view drawing.

In the alternate detent mechanism illustrated in FIGS. 20A and 20B, as pivot pin 115 is press fit into position in arm 26, the wave ridges 126 of wave washer 98 bear against the step 122, shown in FIG. 20A. As hook 90 is rotated with respect to pivot pin 115, wave ridges 126 engage notches 124, thereby forming a detent mechanism. Thus, in order to engage detent mechanism of FIGS. 20A and 20B, the user simply rotates hook 90 until wave ridges 126 engage the next notches 124. Thus, the wave ridges 126 and notches 124 of FIG. 20A and 20B serve to function as a detent mechanism, also allowing the hook 90 to pivot to one of several predetermined positions.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A grab rail assembly attachable to a structural portion of a vehicle, comprising:
    a handle having a pair of opposing ends, each end having a coupling secured thereto;
    a base element pivotally connected with each of said couplings in order to pivotally connect said handle to each base element, each base element engageable with the structural portion of the vehicle;
    a biasing device engageable with each coupling, each biasing device biasing each respective coupling into one of a plurality of discrete positions with respect to each base element; and
    a fastener extending through each respective biasing device and base element, securing each respective biasing device and base element to the structural portion of the vehicle.

2. The grab rail assembly of claim 1, wherein the coupling includes a pin having first and second longitudinally extending flat surfaces cooperatively engageable with respective biasing device, such that when said first flat surface engages said biasing device, said handle is in a stowed position and when said second flat surface engages said biasing device, said handle is in an extended position.

3. The grab rail assembly of claim 2, wherein said biasing device is a cantilever spring having a leg portion extending outwardly therefrom and engageable with said first and second flat surfaces of said pin.

4. The grab rail assembly of claim 3, wherein said cantilever spring also has a vertical member bearing against said base element.

5. The grab rail assembly of claim 4, wherein said fastener is a machine screw extending through said vertical member of said cantilever spring and through said base element into the structural portion of the vehicle.

6. The grab rail assembly of claim 3, wherein said leg portion includes an upper portion and a lower portion, said upper portion extending away from said corresponding base element and said lower portion, extending below and toward said corresponding base element from a remote end of said upper portion.

7. The grab rail assembly of claim 6, wherein said lower portion has a corrugation.

8. The grab rail assembly of claim 1, wherein each coupling includes a pivot pin having first, second and third longitudinally extending flat surfaces, wherein two of said flat surfaces are perpendicular with respect to one another, and the remaining flat surface is diagonal with respect to said two flat surfaces, such that said pivot pin is symmetrical about a plane, longitudinal with respect to the axis of said pivot pin, bisecting an intersection of said two perpendicular flat surfaces, said plane also being perpendicular to said remaining flat surface.

9. The grab rail assembly of claim 1, further comprising a hook member pivotally connected to one of said couplings.

10. A grab rail assembly attachable to a structural portion of a vehicle, comprising:
    a handle having a pair of opposing ends;
    a pivot pin fixed to each end of said handle, said pivot pin having two longitudinally extending flat surfaces;
    a base element pivotally connected to each pivot pin, and therefore to said handle, each base element engageable with the structural position of the vehicle;
    an L-shaped spring corresponding to each base element and having a vertical element and a leg, said leg having a surface for bearing against said flat surfaces of said pivot pin in order to bias said pivot pin and said handle into one of a plurality of discrete positions with respect to each base element; and
    a fastener for fixing said vertical element of each L-shaped spring and each corresponding base element to said structural portion of the vehicle.

11. The grab rail assembly of claim 10, wherein said plurality of discrete positions are a stowed position and an extended position.

12. The grab rail assembly of claim 10, wherein said L-shaped spring is a cantilevered spring.

13. The grab rail assembly of claim 10, wherein said pivot pin has a round first end portion and a combination flat and curved second end, and wherein said second end fits into a corresponding recess in a second end of an arm of said handle, and said round first end portion fits into a hole in a first end of said arm of said handle.

14. The grab rail assembly of claim 10, wherein said leg portion includes an upper portion and a lower portion, said upper portion extending away from said corresponding base element and said lower portion, extending below and toward said corresponding base element from a remote end of said upper portion.

15. The grab rail assembly of claim 10, wherein said pivot pin has a round first end portion and a second end having flat surfaces, such that said second end fits into a corresponding recess in a second end of said handle, and said round first end portion fits into a hole in a first end of said recess of said handle.

16. The grab rail assembly of claim 10, further comprising a hook member pivotally connected to said pivot pin.

17. A grab rail assembly attachable to a structural portion of a vehicle, comprising:
  a handle having a web portion and a plurality of arms, each arm having a cut out portion at a remote end thereof;
  a pair of base elements engageable with the structural portion of the vehicle, each base element being positioned within said cut out portion of each of said arms;
  a coupling secured to each remote end of said handle, each coupling pivotally connecting said handle to a corresponding one of said base elements;
  a biasing device engageable with each coupling, each biasing device engaging said corresponding coupling to bias said coupling into one of a plurality of discrete positions with respect to said base element; and
  a fastener extending through each biasing device and corresponding base element, securing each biasing device and corresponding base element to the structural portion of the vehicle.

18. The grab rail assembly of claim 17, wherein said coupling includes a pivot pin having first and second longitudinally extending flat surfaces cooperatively engageable with said biasing device, such that when said first flat surface engages said biasing device, said handle is in a stowed position and when said second flat surface engages said biasing device, said handle is in an extended position.

19. The grab rail assembly of claim 18, wherein said biasing device is a cantilever spring having a leg portion extending outwardly therefrom and engageable with said first and second flat surfaces of said first pin.

20. The grab rail assembly of claim 19, wherein said cantilever spring also has a vertical member bearing against said corresponding base element.

21. The grab rail assembly of claim 20, wherein said fastener is a machine screw extending through said vertical member of said cantilever spring and through said base corresponding element into the structural portion of the vehicle.

22. The grab rail assembly of claim 19, wherein said leg portion includes an upper portion and a lower portion said upper portion extending away from said corresponding base element and said lower portion, extending below and toward said corresponding base element from a remote end of said upper portion.

23. The grab rail assembly of claim 17, wherein said coupling includes a pivot pin having a first, second and third longitudinally extending flat surfaces, wherein two of said flat surfaces are perpendicular with respect to one another, and the remaining flat surface is diagonal with respect to said two flat surfaces, such that said pivot pin is symmetrical about a plane, longitudinal with respect to the axis of said pivot pin, bisecting an intersection said two perpendicular flat surfaces, said plane also being perpendicular to said remaining flat surface.

24. The grab rail assembly of claim 17, further comprising a hook member pivotally connected to one of said couplings.

25. A combination of a grab rail and a hook assembly attachable to a structural portion of a vehicle, said combination comprising:
  a handle having a pair of opposing ends;
  a pair of base elements engageable with the structural portion of the vehicle;
  a coupling pivotally connecting each base element to an opposing end of said handle, each coupling being secured to one end of said handle; and
  a hook member pivotally connected to one of said couplings.

26. The combination of claim 25, wherein said hook assembly includes a detent mechanism operatively connected to said hook member and defining the pivotal movement of said hook member into discrete positions.

27. The combination of claim 26, wherein said detent mechanism includes a biasing member bearing against a part of said vehicle and said hook member, said biasing member having a plurality of wave ridges, one of said hook member and said part of said vehicle having a plurality of notches, said wave ridges being releasably seated in each of said notches, said biasing member being positioned between said part of said vehicle and said hook member such that said biasing member exerts a biasing force on said hook member such that said wave ridges remain seated in said notches, thereby preventing pivotal movement of said hook member; said wave ridges being unseated from said notches so that said hook member can be pivoted around said coupling pin upon a rotational force being applied to said hook member of magnitude that overcomes the biasing force of said biasing member.

28. The combination of claims 27, wherein said hook member includes an eye portion, said coupling being inserted through said eye portion, said eye portion having opposite sides, at least one of said sides having said plurality of notches spaced circumferentially around said side.

29. The combination of claim 28, wherein said biasing member is one of a wave washer and a coil spring, said coupling being inserted through said biasing member.

30. The combination of claim 29, wherein said eye portion has a recess therein the said recess laterally supporting said biasing member.

31. The combination of claim 30, including a biasing device engageable with said coupling, said biasing device engaging said coupling to bias said coupling into one of a plurality of discrete positions with respect to a corresponding one of said base elements.

32. The combination of claim 31, wherein said coupling includes a pivot pin having a plurality of longitudinally extending flat surfaces wherein said biasing device engages one of said longitudinally extending flat surfaces to form one of said discrete positions.

33. The combination of claim 31, including a fastener, securing each biasing device and corresponding base element to the structural portion of the vehicle.

34. The combination of claim 26, wherein said detent mechanism includes:
  (a) a biasing member, bearing against a part of the vehicle and said hook member, and
  (b) a projection on said coupling, in cooperative relationship with notches formed in an eye portion of said hook member, such that, due to said biasing member, said projection remains in engagement with one of said notches until a torsional force is applied to said hook member, sufficient to overcome a biasing force applied by said biasing member.

* * * * *